United States Patent
Levinson

(10) Patent No.: US 8,154,414 B2
(45) Date of Patent: Apr. 10, 2012

(54) SYSTEMS AND METHODS FOR COLLECTING DATA WITH SENSORS

(75) Inventor: Frank Levinson, Syracuse, IN (US)

(73) Assignee: Finisar Corporation, Sunnyvale, CA (US)

( * ) Notice: Subject to any disclaimer, the term of this patent is extended or adjusted under 35 U.S.C. 154(b) by 99 days.

(21) Appl. No.: 11/278,117

(22) Filed: Mar. 30, 2006

(65) Prior Publication Data

US 2006/0250276 A1 Nov. 9, 2006

Related U.S. Application Data

(60) Provisional application No. 60/666,903, filed on Mar. 31, 2005, provisional application No. 60/666,906, filed on Mar. 31, 2005, provisional application No. 60/666,905, filed on Mar. 31, 2005.

(51) Int. Cl.
*G08B 23/00* (2006.01)

(52) U.S. Cl. ............... 340/573.2; 340/870.07; 600/300; 600/410; 128/903; 128/904

(58) Field of Classification Search ............... 600/300, 600/410; 128/903, 904; 340/870.07, 870.11
See application file for complete search history.

(56) References Cited

U.S. PATENT DOCUMENTS

| | | | |
|---|---|---|---|
| 4,485,391 A | 11/1984 | Poulain et al. | |
| 5,362,976 A | 11/1994 | Suzuki | |
| 5,434,939 A | 7/1995 | Matsuda | |
| 5,745,030 A | 4/1998 | Aaron | |
| 5,752,976 A * | 5/1998 | Duffin et al. | 607/32 |
| 5,862,803 A * | 1/1999 | Besson et al. | 600/508 |
| 5,864,220 A * | 1/1999 | Reipur et al. | 320/134 |
| 6,074,102 A | 6/2000 | Oikawa | |
| 6,271,766 B1 * | 8/2001 | Didden et al. | 340/853.1 |
| 6,395,585 B2 | 5/2002 | Brandl | |
| 6,534,705 B2 | 3/2003 | Berrios et al. | |
| 6,568,863 B2 | 7/2003 | Murata | |
| 6,659,659 B1 | 12/2003 | Malone | |
| 6,791,611 B2 | 9/2004 | Yang | |
| 6,807,218 B1 | 10/2004 | Greenwood et al. | |
| 6,840,177 B1 * | 1/2005 | Hatteland | 102/361 |
| 6,889,165 B2 | 5/2005 | Lind et al. | |
| 6,900,509 B2 | 5/2005 | Gallup et al. | |
| 6,942,396 B2 | 9/2005 | Marion et al. | |
| 6,981,804 B2 | 1/2006 | Jian | |
| 6,989,589 B2 | 1/2006 | Hammadou et al. | |
| 7,021,132 B2 * | 4/2006 | Nigon et al. | 73/146.5 |

(Continued)

OTHER PUBLICATIONS

"Photonic Power—Isolated Power Delivery Systems", Photonic Power Products: Photovoltaic Power Converters, Photonic Power Modules, Optically Powered Data Link System. http://www.jdsu.com/index.cfm?pagePath=Products/Photonic_Power JDS Uniphase Corporation, Copyright 2006.

(Continued)

*Primary Examiner* — Timothy Edwards, Jr.
(74) *Attorney, Agent, or Firm* — Maschoff Gilmore & Israelsen

(57) ABSTRACT

Systems and methods for collecting data. A modular sensing system includes a renewable power source with wireless and/or optical communication modules, a processing plane, and a sensing plane. The sensing systems can be deployed in various environments or on active subjects. A device with various components can be used to interact with the sensing system and collect data in real time or at a later time. Sensing systems can be enclosed within a structure or body and then recharged or renewed using an optical signal transmitted through the boundary.

9 Claims, 4 Drawing Sheets

U.S. PATENT DOCUMENTS

| | | | |
|---|---|---|---|
| 7,093,986 | B2 | 8/2006 | Scofet et al. |
| 7,178,994 | B2 | 2/2007 | Tourne |
| 7,179,680 | B2 | 2/2007 | Fries |
| 7,244,500 | B2 | 7/2007 | Watts et al. |
| 7,285,834 | B2 | 10/2007 | Leib et al. |
| RE040,416 | E | 7/2008 | Jian |
| 7,531,842 | B2 | 5/2009 | Gormley |
| 7,599,583 | B2 | 10/2009 | Levinson |
| 7,859,071 | B2 | 12/2010 | Levinson |
| 2003/0033032 | A1 | 2/2003 | Lind et al. |
| 2004/0038087 | A1* | 2/2004 | Shiue et al. ............. 429/7 |
| 2004/0149998 | A1 | 8/2004 | Henson et al. |
| 2004/0178462 | A1 | 9/2004 | Sakaguchi et al. |
| 2004/0208600 | A1 | 10/2004 | Guenter et al. |
| 2005/0017315 | A1 | 1/2005 | Hammadou et al. |
| 2005/0159661 | A1* | 7/2005 | Connelly et al. ............. 600/410 |
| 2006/0133003 | A1* | 6/2006 | Kular et al. ............. 361/100 |
| 2006/0180479 | A1 | 8/2006 | Sparkes et al. |
| 2006/0228998 | A1 | 10/2006 | Levinson |
| 2007/0060800 | A1* | 3/2007 | Drinan et al. ............. 600/300 |
| 2009/0171404 | A1* | 7/2009 | Irani et al. ............. 607/2 |

OTHER PUBLICATIONS

"Powering Remote Data Links over Fiber", JDSU Uniphase Corporation 2006 http://www.JDSU.com.

"Photonic Power Solutions for Communications Deployments", JDS Uniphase Corporation 2005 http://www.JDSU.com.

"MoteWorks TM" Document Part No. 6030-0001-01 Rev A, Crossbow www.xbow.com.

Crossbow Products: OEM Development Kit; Gateways & Network Interfaces Modules; Processor/Radio Modules; Moteworks Hardware Mote Kits; Sensor/Data Acquisition Modules; Mote Systems; Packaging Solutions; Motes, Smart Dust Sensors, Wireless Sensor Networks. Crossbow Technology, Inc., 2006. http://www.xbow.com/Products/productsdetails/.

"Crossbow Announces Industry First with Open, Integrated Platform to Enable Emerging Wireless Sensor Network Market", San Jose, CA: Dec. 5, 2005. Crossbow Technology, Inc. www.xbow.com.

"Wireless Sensor Network Deployments with Fortune 500 Companies Demonstrate Crossbow's Market Leadership", San Jose, CA: Dec. 5, 2005. Crossbow Technology, Inc. www.xbow.com.

"Industrial Wireless Sensor Networking", Published Jun. 28, 2004, ON World Inc. http://onworld.com/html/industrialwirelesssensor.htm.

"ZigBee Competitive Landscape" Published Apr. 14, 2005. ON World Emerging Wireless Research, ON World, Inc. http://onworld.com/zigbee/.

"Wireless Sensor Networks: Growing Markets, Accelerating Demand", Published Jul. 25, 2005. ON World Emerging Wireless Research, ON World, Inc. http://onworld.com/wsn/wirelesssensors.htm.

"Wireless Sensor Networks Technology Dynamics", Published Jul. 25, 2005, ON World, Inc. http://onworld.com/wsn/wsntechdyn.htm.

"Wireless Sensor Networking for AMR & Submetering", Published Oct. 20, 2004, ON World, Inc. http://onworld.com/html/fwamrsynopsis.htm.

"Wireless Sensor Networks for the Oil & Gas Industry", Published Oct. 11, 2005, ON World, Inc. http://onworld.com/wsn/oil&gas.htm.

Specifications 9XStream (900 MHz), 24XStream (2.4 GHz) MaxStream, Inc., 1998-2003.

Specifications for the 9XCite MaxStream, Inc., 2004.

9XTend 900 MHz OEM RF Module Specifications MaxStream, Inc., 2005.

XBee & XBee-PRO 2.4 GHz OEM RF Modules Specifications MaxStream, Inc., 2005.

U.S. Appl. No. 11/278,067, mailed Apr. 15, 2010, Notice of Allowance.

U.S. Appl. No. 11/278,067, Mail Date Apr. 15, 2010, Notice of Allowance.

U.S. Appl. No. 11/278,067, Mail Date Aug. 19, 2010, Notice of Allowance.

U.S. Appl. No. 11/278,067, Mail Date Feb. 26, 2010, Restriction Requirement.

U.S. Appl. No. 11/278,116, Mail Date May 21, 2009, Notice of Allowance.

U.S. Appl. No. 11/278,116, Mail Date Feb. 11, 2009, Notice of Allowance.

U.S. Appl. No. 11/278,116, Mail Date Sep. 9, 2008, Office Action.

\* cited by examiner

SYSTEMS AND METHODS FOR COLLECTING DATA WITH SENSORS

RELATED APPLICATIONS

This application claims the benefit of:

U.S. Provisional Application Ser. No. 60/666,903 filed Mar. 31, 2005 and entitled SYSTEMS AND METHODS FOR COLLECTING DATA WITH SENSORS;

U.S. Provisional Application Ser. No. 60/666,906 filed Mar. 31, 2005 and entitled POWER AND COMMUNICATION INTERFACE FOR SENSORS USING A SINGLE TETHERED FIBER; and U.S. Provisional Patent Application Ser. No. 60/666,905 filed Mar. 31, 2005 and entitled SENSORS WITH MODULAR ARCHITECTURE;

which applications are incorporated herein by reference.

BACKGROUND OF THE INVENTION

1. The Field of the Invention

The present invention relates to the field of sensors sensing systems. More particularly, embodiments of the invention relate to systems and methods for collecting data with sensors included in sensing systems.

2. The Relevant Technology

In general, a sensor is a device that generates an output based on some type of input. Sensors have been developed that can respond to a wide range of inputs including, by way of example, nuclear, electromagnetic, chemical, biological, thermal, and mechanical inputs. The ability to respond to many different types of input has made sensors an important aspect of both existing and new technologies. As a result, sensors are increasingly used in a wide range of activities that include, for example, medicinal purposes, environmental purposes, commercial endeavors, industrial activities and biological functions.

In each of these types of activities, there is a growing dependence on the ability to collect, monitor, and analyze data. Sensors help in this endeavor by facilitating and improving the process of collecting and analyzing the data. For instance, sensors are usually able to detect a situation more rapidly than a person can detect the same situation. Sensors can also detect subtle changes and detect minute quantities that a person cannot discern. In addition, sensors can be deployed in locations and situations where it is often impractical to deploy people.

The data collected by sensors can be used in various ways. Sensor data can be collected over time to monitor trends or to measure changes over time. For example, traffic patterns are collected with sensors over time before implementing a form of traffic control. Collecting the traffic data over time enables the resulting traffic control system to be more efficient.

Sensors can also collect data that can be analyzed and used to make quick decisions. For example, automobiles have multiple sensors that collect information used to determine when an air bag should be deployed—a decision that should be made very quickly. Clearly, the air bag should not be deployed unnecessarily but only when an accident occurs. As a result, the data collected by the multiple sensors is analyzed collectively to distinguish, for instance, between a true accident and when someone is simply leaning forward.

Sensors are also used, for example, in field biology to monitor the behavior of birds and animals. The migratory pattern of birds, for example, can be tracked using sensors. However, this information is usually collected after a sensor attached to a particular bird has been retrieved. The data is obtained after the corresponding behavior has occurred. In some instances, significant time may have passed between when the data was collected and when the data was available for analysis.

While sensors can have a beneficial impact on the ability to collect, monitor, and analyze data, there are some limitations that have not been overcome. Some of these limitations relate, for example, to when the data can be collected and to the ability of a sensor to be adapted to new uses and situations. Conventional sensors have components that cannot be readily substituted with other components and they do not have a modular architecture. In addition, conventional sensors are not able to adapt to new sensor configurations or provide the support in terms of both hardware and software that may be required for multiple sensor configurations.

BRIEF SUMMARY OF THE INVENTION

These and other limitations are overcome by embodiments of the invention which relate to collecting data with sensors. Exemplary sensing systems have a modular architecture. The modular architecture enables finished sensing systems to have a common form even though adapted for varying purposes. The modular architecture includes one or more planes that are each adapted for specific purposes. Power and communication modules are located on one plane, processing modules and memory are located on another plane, and sets of sensors are located in additional planes. The planes are constructed to enable both interplane and intraplane connectivity including electrical, mechanical, and/or optical connectivity.

In one example, a sensing system may be tethered with an optical fiber. An optical signal delivered through the optical fiber can be used to generate a photovoltaic current that can charge a battery or provide operational power. The sensing system may also include a laser in conjunction with the photovoltaic functionality to enable the sensor to transmit over the tethered optical fiber. In this manner, the sensing system can achieve full duplex communication and both receive and transmit data over an optical fiber.

The communication module typically communicates using radio frequencies or via an optical connection. The sensing system's communication module can therefore connect with a device in real time and as monitored actions or behavior occurs. Various components can typically connect with the device and enable the data from multiple sensors in multiple sensing systems to be evaluated and presented to a user of the device. The components can be selectively activated depending on the set of sensors from which data is collected. In one embodiment, the sensing systems can be deployed in multiple locations and can all report to a single data collection point. The collection of data can occur using optical transmission, wireless transmission (including Blue tooth) and the like or any combination thereof.

In addition to remotely collecting data in field environments, a sensing system can be embedded or enclosed within a body or other structure. A boundary is present between the sensing system and the device used to collect data from the sensing system. If the sensing system includes an optical interface, one end of the interface is placed near the boundary of the structure. Using a corresponding interface on the other side of the boundary, an optical signal can be transmitted through the boundary to the sensing system. The optical signal transmitted across the boundary can carry data to the sensing system or be used to renew the power source of the sensing system. The boundary can be the skin of a person or animal, for example. Enclosing the sensing system within a subject's body allows the skin to heal and helps reduce infection while still permitting the sensing system to be recharged, reprogrammed, and the like.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
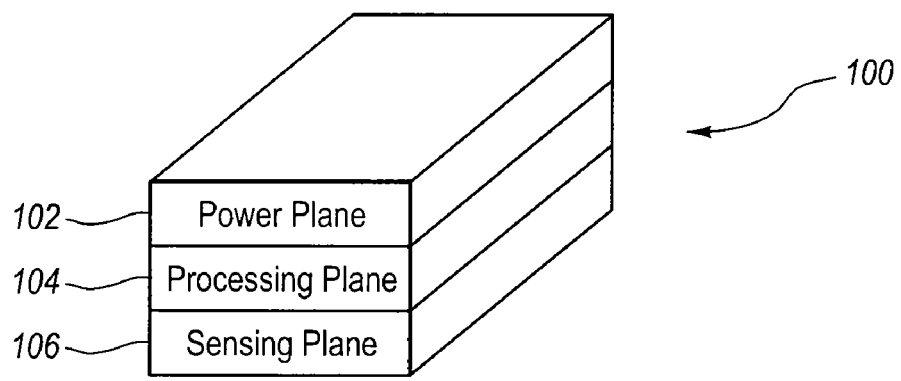
FIG. 1 illustrates one embodiment of a perspective view of a modular sensing system.

Embodiments of the invention relate to sensing systems as well as to systems and methods for collecting data and in particularly to collecting data from sensing system including remote sensing system. Embodiments of the invention can be used in a wide variety of different circumstances and environments. In one example, a portable device with multiple sensor components can be operated through a common software interface. The components can be selectively connected with the portable device in order to collect data from various sensing systems. The selected components are typically related to the sensing system from which data is collected.

The portable device and the components communicate (wireless communication, optical communication, etc.) with the sensing system to collect data from the sensing system that may be, for example, remotely located from the device. The components can be interchanged to take advantage of other sensors that may be available in the sensing systems. In addition, the data can be collected in real time and in real conditions. This improves the quality of the collected data, which can be stored and analyzed at a later time if necessary.

Embodiments of the invention can be applied in diverse environments and in different fields. Exemplary environments include biological, chemical, geological, aquatic, nuclear, and the like or any combination thereof. Embodiments of the invention may be described in a particular environment, but one of skill in the art can appreciate that the systems and methods described herein can be applied in other environments as well. Before describing the systems and methods for collecting the data from the sensing systems, a description of exemplary sensing system used in the collection of data is first presented.

Modular Sensor Architecture

Embodiments of the sensing system used to collect data have a modular architecture that includes stackable planes. Each plane may have multiple layers and is able to provide both interplane and intraplane connectivity. The connectivity can be, by way of example, mechanical, optical, and/or electrical. This connectivity enables the sensing system to be adapted for specific functionality by using differently configured planes. As a result, multiple sensor configurations can be selected by swapping out one plane for another. The ability to exchange or replace a particular plane is supported by the modular architecture of the sensing system. Typically, a specific set of sensors is selected during manufacture. To replace a particular set of sensors with another set of sensors could include swapping out the entire sensing system. This is achieved in view of the modular architecture which provides an identical interface for various configurations of the sensing system.

Once the appropriate set of planes are selected for a sensing system in a given application, the planes are assembled into an integrated sensing system. This is achieved, for example, by bonding the planes together. When the planes are bonded together or otherwise assembled, the various components in the respective planes become electrically connected. As the planes are assembled, certain connections may be made permanent by soldering or other form of bonding. This enables interplane communication and permits data collected from one plane, for example, to be accessible to other components within the sensing system structure.

The architecture of the modular sensing systems and the interplane communication also accommodates systems and methods for powering the sensing system or for renewing or recharging a sensing system's power supply. Because the power supply is renewable or rechargeable, the sensing system can both remain in a remote location and also have the ability to transmit/receive data without draining the power supply and consequently shortening the life of the sensor.

FIG. 1 illustrates one embodiment of a sensing system 100. The sensing system 100 has a modular architecture that includes multiple planes. The planes of the sensing system 100 are typically independent of each other and can therefore be assembled in different configurations by changing out one plane for another. If one of the planes includes a sensor or a set of sensors, for example, then the capability of the sensing system 100 to collect or monitor data can be changed by simply providing a plane with different sensors. The various planes of the sensing system 100 are stackable and provide interplane communication when assembled together. The interplane communication accommodates different sensor configurations and the like. Each plane can also have multiple layers with conductive paths imprinted on the various layers to enable intraplane communication.

Figure 2:
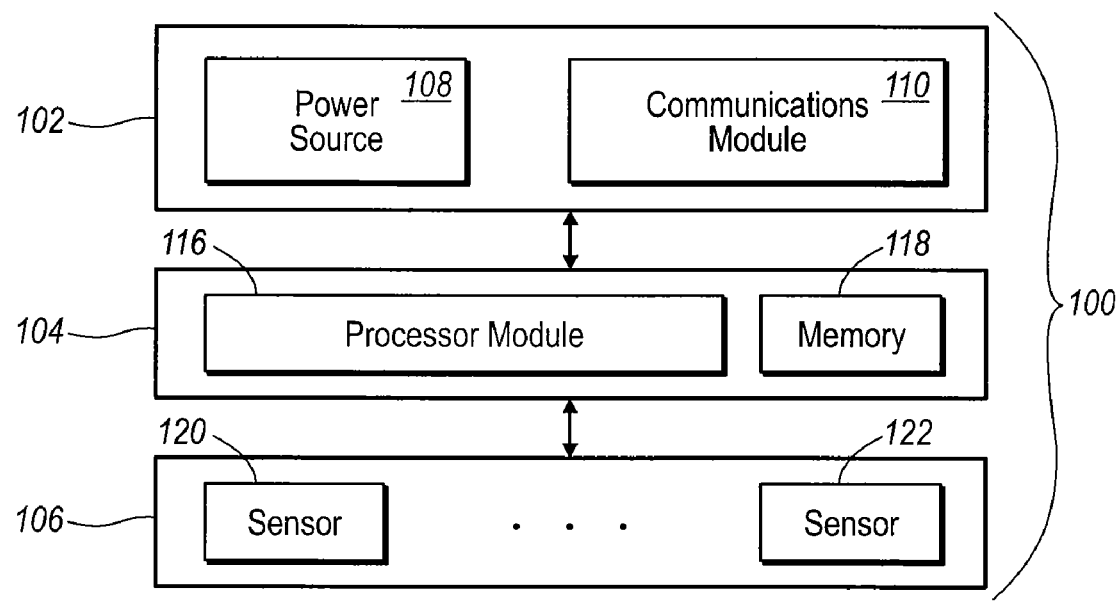
FIG. 2 illustrates examples of planes in a modular sensing system architecture including a power plane, a processing plane, and a sensor plane.

With reference to FIGS. 1 and 2, one embodiment of the sensing system 100 includes a power plane 102, a processing plane 104, and a sensing plane 106. These planes 102, 104, and 106 can be assembled together to form an integrated sensing system 100. The various components within the respective planes can be arranged such that interplane communication is possible even when a new plane is selected for inclusion in a particular sensor. Additional planes can be added to provide additional functionality or for other reasons such as forming a hermetic seal for the sensor's components. The multiple layers of each plane also enable components in the same plane to be connected together. Thus, each plane can include vias, conductive paths, and the like.

The power plane 102 includes components that provide power to the sensing system 100. The power source 108 provides the power required both the processing plane 104 and the sensing plane 106. The components in power plane 102 may also include a communication module 110 that is powered by the power source 108. Although certain components are illustrated as being in particular planes, one of skill in the art can appreciate that the components can be placed in any plane. The communication module 110, for example, may be included in its own plane or in one of the other planes. This can enable a larger battery to be accommodated in the power plane.

The power source 108 can be renewable or rechargeable. A renewable or rechargeable power source 108 enables the communication module 110 to transmit more effectively and with more power because the power source 108 can be recharged. Advantageously, this enables the sensing system 100 to communicate wirelessly without fear that the sensing system 100 will drain its power supply and have a relatively short sensor life. A renewable power source 108 therefore facilitates the collection of data in real time. Data can be collected remotely without having to physically access the sensing system and connect it to another device to download the collected data. In a biological environment, for example, the data can be observed and collected without interfering with the biological processes. This enhances the collection of data in real time. In addition, the behavior can also be personally observed as the data is collected and embodiments of the invention contemplate the addition of human generated notes to the collected sensor data. The notes, by way of example and not limitation, can provide additional insight or context to the collected sensor data.

The processing plane 104 may include various combinations of components that are used to process or store the data collected or provided by sensors in the sensing plane 106. In this example, the processing plane 104 includes a processor module 116 and associated memory 118. The memory 118 may include volatile (e.g., RAM) and/or nonvolatile memory (e.g., FLASH memory). The nonvolatile memory can be used to store, by way of example, the analyzed or processed sensor data as well as other code executed by processor module 116. One of skill in the art can appreciate that the processor module 116 may be implemented as a microprocessor or as another device such as a microcontroller and the like.

The processing plane 104 may also include one or more field programmable gate arrays (FPGAs). The FPGAs can be either digital or analog in nature and can therefore be configured to perform various tasks. The FPGAs can provide, by way of example and not limitation, analog to digital converters, digital to analog converters, timers, counters, amplifiers, filters, pulse width modulators, and the like or any combination thereof. In one embodiment, the processing plane 104 may include a PSOC™ Mixed Signal Array available from Cypress MicroSystems.

Because the sensing system 100 can receive data wirelessly and therefore remotely, the processing plane can be configured, updated, or reprogrammed remotely. This enables code stored in the processing plane to be updated or altered. In one embodiment, the sensing systems can be remotely reprogrammed to perform new or additional functions. Sensing systems can be recalibrated remotely as well.

The sensing plane 106 includes one or more sensors that collect data. The data collected by the sensors in the sensing plane 106 can be processed by the processing plane 104 and communicated to a remote device through the communication module 110 provided in the power plane 102. Alternatively, the processed data can be stored in the memory 118 until it is retrieved at a later date either remotely or directly. Sensors that can be included in the sensing plane 106 include, but are not limited to, biological sensors, chemical sensors, physical sensors (temperature, speed, pressure, etc.), electromagnetic sensors, nuclear sensors, medical sensors, and the like or any combination thereof. Because the sensing system 100 can receive data remotely, the sensors in the sensing plane 106 can be activated and/or deactivated as required.

Figure 3:
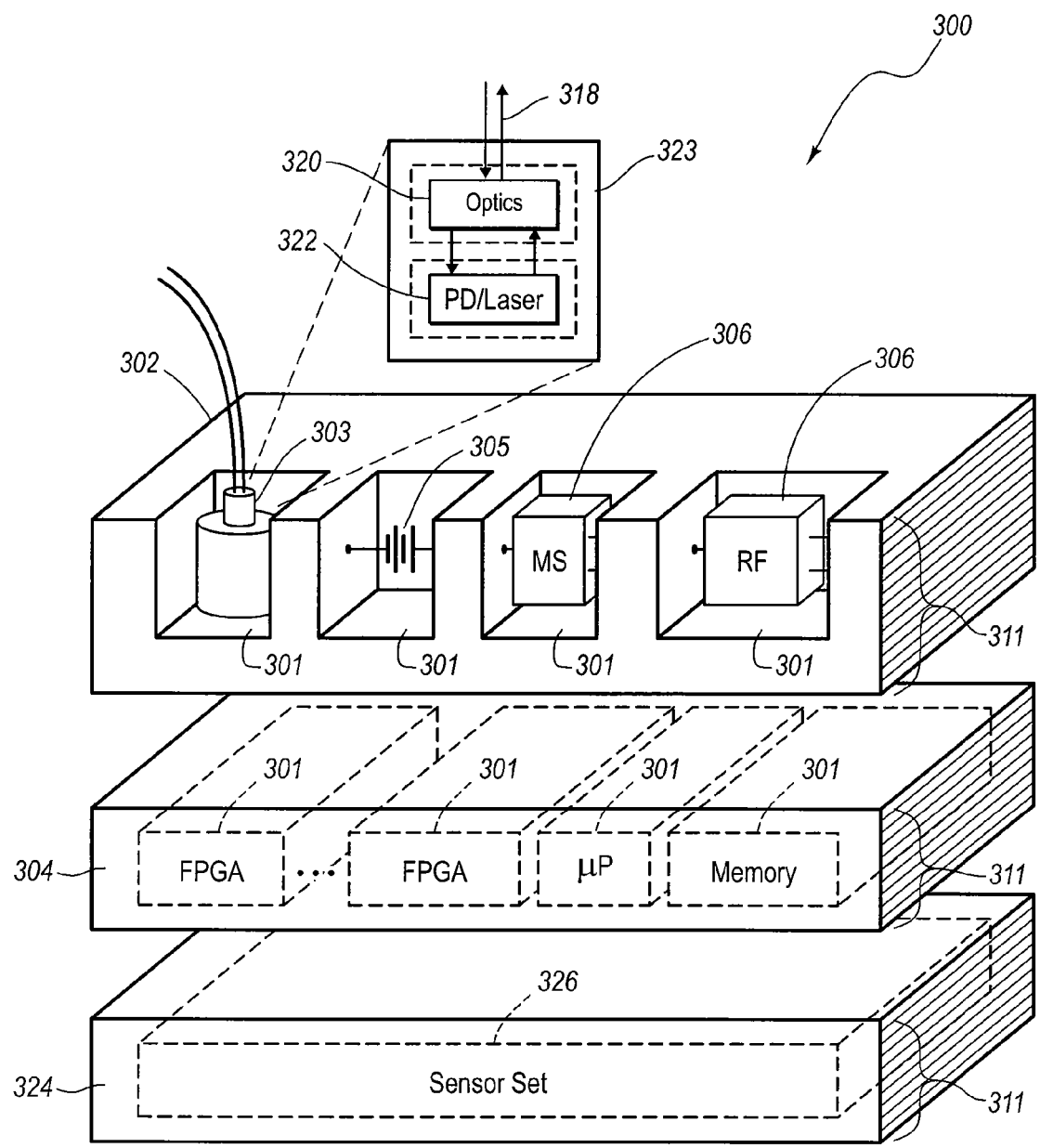
FIG. 3 illustrates one embodiment of a plane that includes multiple layers with cavities for accommodating components that are included in a sensor.
Figure 4:
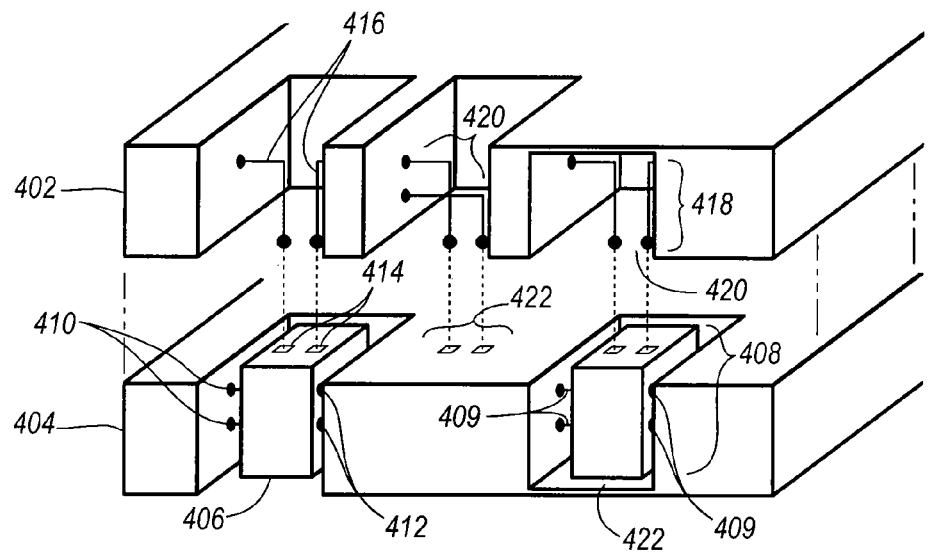
FIG. 4 illustrates examples of interplane connectivity in a modular sensing system.

FIG. 3 illustrates examples of planes that may be included in a sensor 300. This example of a sensing system 300 illustrates a power plane 302, a processing plane 304, and a sensing plane 324 with a set of sensors 326. In one embodiment, the planes 302, 304, 324 may be formed from a ceramic material known in the art as "green clay" and may include multiple layers 311. Conductive paths and other components can be located or printed on each of the layers 311 that make up a particular plane. Each plane may include vias as well to connect conductive paths on one layer with conductive paths on another plane. Examples of interplane connectivity are illustrated in FIG. 4.

The plane 300 also includes cavities 301. Some of the cavities 301 may pass completely through a plane, while other cavities may only open on one side of a particular plane. Other cavities may be enclosed within a particular plane. As the planes are assembled together, cavities from adjacent planes may form hermetic cavities. The cavities 301 may be used to hold various components that may not be an integral part of a particular layer like the conductive paths on the layers 311. The cavities 301 can hold more bulky components yet still permit assembled sensors to have a compact and common shape and size if desired. The cavities enable the planes to retain a planar shape, which is useful to facilitate the assembly of the integrated sensors and provide the stackability of the planes.

In the plane 304 shown in FIG. 3, each of the FPGAs 310, 312, the microprocessor 314, and the memory 316 are located within a corresponding cavity of the plane 304. Various types of connections can be used to connect components placed within the various cavities of the plane 304. Also, placing components within the cavities ensures that the layers remain stackable and can be fabricated in a uniform manner even though the various planes include different components including different sensors.

FIG. 3 also illustrates examples of the power source and communication module that may be included in the plane 302. The plane 302 in this example illustrates a tethered optical fiber module 303. The module 303, as illustrated in the box 323, can include an optical fiber 318 that is connected with optics 320 and a photodiode/laser 322. An optical signal can be delivered over the fiber 318. The optics 320 can ensure that the optical signal is incident on the photodiode/laser 322 to create a current that can then be used for power or to renew the battery 305. More particularly, the incident optical signal generates a current in the photodiodes included in the photodiode/laser 322. The optical signal delivered through the fiber 318 can also be modulated to deliver data to the sensor.

When acting as a laser, the photodiode/laser 322 can be modulated to transmit data collected by the sensor. In one embodiment, the sensing system can receive and transmit at the same time. This can occur, for example, when the received optical signal has a first wavelength and the laser has a second wavelength. If necessary, the battery 305 can be used to boost or solely provide the power needed to use the laser to transmit data via the fiber 318. If the battery 305 is depleted, it can be recharged using the current generated from the incident optical signal on the photodiodes.

The sensing system may also include a mechanical system 306 that can store energy that may be used to charge the battery 305 as well as other purposes. One of skill in the art can appreciate those mechanical systems that store energy as the sensing system moves (such as when connected to a moving animal or bird, for example). Once the energy reaches a certain level in the mechanical system, it can be released, for example, and converted and stored as chemical energy in the battery 305.

The RF (radio frequency) module 306 is another module that can be used for wireless communication. If the mechanical system 306 is used to charge the battery 305, or if the battery can be renewed via the module 303, then the sensor is not necessarily spatially confined. The sensor 300 can both transmit/receive over the RF module 306. In addition to the battery or in place of the battery, the current generated by the optical signal delivered over the fiber 318 can be used to power the RF module 306.

As described above, the photodiode/laser 322 includes both a photodiode and a laser. In this example, the photodiode/laser 322 is an integrated semiconductor device that is grown in series. The photodiode/laser 322 includes, in one example, a series of photodiodes and a semiconductor laser grown monolithically. The photodiode/laser 322 may also include a transistor that can be turned on/off to control when the laser is active. The transistor may also control the ability to direct the current in the photodiodes to the battery, to the laser, or to other portions of the sensor. This may increase the amount of current available for charging the power supply or for other purposes of the sensor.

In one example, the photodiodes are not biased and the fiber 318 is configured to emit light that is incident on the photodiodes. The incident light, under the photovoltaic effect, generates current in the photodiodes that can be used, for example, to charge a battery in the sensor. The voltage generated across the photodiodes by the incident light from the optical fiber 318 may also be used to bias the photodiode/laser 322, which can be either an edge emitting laser or a vertical cavity surface emitting laser. The photodiode/laser 322 can be used to transmit data back through the fiber 318 as previously described. The photodiode/laser 322 therefore enables communication to and from the sensor through a single optical fiber.

The materials selected to fabricate the photodiode/laser 322 may be selected based on the associated wavelengths. For example, the photodiodes may be optimized to detect wavelengths on the order of 850 or 980 nanometers. The laser may use a material system optimized to emit light on the order of 1310 or 1550 nanometers. The material system for both the photodiodes and the laser may be the same. Material systems for 850 or 980 nanometers include GaAs and material systems for 1310 or 1550 nanometers include AlGaAs or InGaAsP. The specific material system selected for the photodiodes and the laser may depend, for example, on the length of the optical fiber. One of skill in the art can appreciate that other material systems may be selected to fabricate the photodiode/laser 322. One embodiment of the photodiode/laser 323 is further described in U.S. Publication No. US 2004/0208600 A1 and in U.S. Publication No. US 2003/0223756 A1, which are both hereby incorporated by reference.

The optical fiber 318 tethered to the sensing system 300 is used to deliver the optical power to a sensing system. The tethered fiber enables the sensing system 300 to be placed in a remote location. A person can then interface with the sensing system 300 through the other end of the optical fiber that is typically placed in a more convenient location than the sensing system itself. For example, when a new optical line or power line is being buried, sensing systems can be included to monitor various aspects. The sensing system is thus buried along with the new line and the other end of the optical fiber tethered to the sensing system is located in a more amenable location. Through this fiber, the sensing system can be recharged, reprogrammed, etc. Data collected by the sensing system can also be transmitted through the fiber.

One of skill in the art can appreciate that such a tethered sensing system can be placed in a wide variety of locations and situations. For example, the optical fiber 318 further enables the sensing system to be placed in locations where an electrical cable is unsuitable, such as in refineries, petrochemical towers or other places where potential sparks are unwanted. In fact, a tethered sensing system can be used in a variety of environments including, by way of example and not limitation, ocean floors, oil and gas fields, geographic structures such as volcanoes, animal habitats, ecosystems and the like. The sensing system 300, once placed in an environment, can then be accessed through the optical fiber 318 without having to disturb the environment as it would be disturbed by accessing the sensor directly. The data provided by the sensing system in real time more accurately reflect a real situation and one that is not necessarily influenced by the presence of a person.

FIG. 4 illustrates an example of interplane communication in a sensor. FIG. 4 illustrates a processing plane 402 and a sensing plane 404 before the planes are integrated or bonded together. The sensing plane 404 includes a sensor 406 and a sensor 408 that are each disposed within a corresponding cavity of the sensing plane 404. The sensor 406 is connected to one or more layers of the sensing plane through the connections 410 and 412. The connections 410 and 412 may include, by way of example, $I^2C$, power, and the like. The sensor 408 has similar connections 409.

The processing plane 402 has leads 416 and 418 that are formed within corresponding cavities of plane 402. In this example, the leads 416 are configured to come into contact with the contacts 414 when the processing plane 402 is connected or bonded with the sensing plane 404. In another embodiment, the leads 420 can contact the contacts 422, which may be connected with one of the sensors 406 and or 408 through various layers of the plane 404.

When the sensing system is fabricated, the various planes are positioned such that the leads in one plane match up with the contacts in another plane. Then, the planes are bonded or otherwise connected together to form a sensing system. During fabrication of the sensing system or of a particular plane when one plane is bonded to another plane, each lead may be secured to a corresponding contact by welding or soldering to ensure a proper electrical contact. Each plane may have an insulation layer to ensure that interplane communication occurs only where specified. The planes can be sealed together to ensure that leads and contacts in respective planes are in adequate contact. Advantageously, some of the components that are placed within cavities of the planes are hermetically sealed. FIG. 4, for example, illustrates that the cavity 420 and the cavity 422 are partial cavities and that the sensor 408 can be hermetically sealed inside the sensor when the planes 402 and 404 are bonded together.

Of course, the structure of the sensor plane can be adapted to accommodate the sensor. As a result, a sensor module may only include a single sensor. For instance, the sensor may need to be exposed or placed in contact with some object in order to collect good data. Other sensors can be enclosed within the sensing system architecture and protected from the elements.

The sensor described can be made in small sizes. In one embodiment, the sensor may have a size of less than 1 cm$^3$, although the sensor can also be smaller or larger. The size of the sensor may depend on the environment in which the sensor is deployed as well as the type of sensor.

Data Collection

Figure 5:
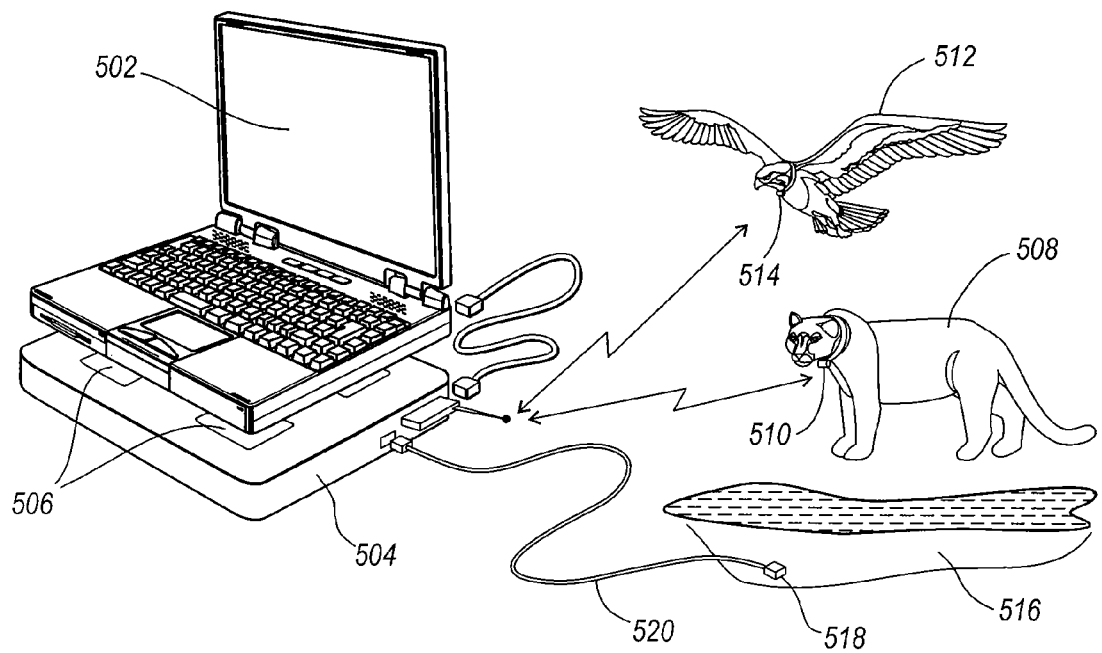
FIG. 5 illustrates an exemplary environment for collecting data from remote sensing systems.

FIG. 5 illustrates one embodiment of a platform for collecting data. In this example, a device 502 such as a laptop computer or tablet computer can be connected with a component box 504 using, for example, a USB interface. The collecting device 502 may also be a cellular telephone that is provisioned appropriately. Using wireless technologies such as Bluetooth, for example, a cellular telephone could collect data from multiple sensing systems. In this sense, the collecting device 502 acts as a central data collection point for multiple sensing systems that may be deployed. Also, the collecting device 502 can then operate on all of the collected data to analyze as needed. A person can also view data collected from multiple sensing systems and using the collected data to generate notes, etc.

The component box 504 can include one or more mounted components as well as provide one or more plug in components. The sensing systems 510, 514, and 518 are placed onto animals, plants, or in other environments. Communication with the sensing systems 510, 514, 518 can occur wirelessly or remotely.

Examples of both the mounted components and/or the plug in components include, but are not limited to, GPS module, digital camera, color measurement module, IR thermometer with laser guiding module, weather module (for humidity, temperature, barometric pressure, wind speed, etc.), microphone module, database access module, laser vibrometer module, chemical analysis module, spectral analysis module, dimensional analysis module, weight measurement module, communication modules, radar module, barcode reader module, transmissive spectral analysis module, mass spectrograph module, gas chromatograph module, calculator module, and the like or any combination thereof. Some of these modules may be included in the sensors. Many of the components interact with and process the data received from the set of sensors that are included in the sensing systems 510, 514, and 518.

The device 502 and/or the component box 504 is also enabled to communicate wirelessly (Virtual BlueTooth, Zigbee, 802.11, etc.) with some of the sensors. For example, a sensing system 514 has been attached to the bird 512 and a sensing system 510 has been attached with the animal 508. The sensing systems 510 and 514 communicate wirelessly with the device 502 or component box 504. The data collected by the sensing systems 510, 514 can be further processed by the device 502 or by the component in the box 504 that is specifically adapted to the sensing systems 510, 514. Advantageously, the data can be collected as the animal or bird functions in its natural environment.

A field biologist, for example, can observe animals and birds in their natural environment. The biologist can use the components to collect data from the sensing systems 510 and 514. At the same time, the biologist can write notes directly into the device 502. The notes can be associated with data collected from the sensing systems. Some of the sensing systems can also be included in the components in the box 504. For example, a component may provide temperature or barometric data that does not necessarily have to be provided from the specific location of the sensing systems 510, 514, 518.

The device 502 can also connect with a sensing system 518 that is located, in this example, at the bottom of a lake 516. The sensing system 518 is permanently placed at a specific location within the lake 516 and a tethered fiber 520 is made accessible to a user at the shore or through a buoy, for example. By connecting the fiber 520 with the device 502 or a component in the box 504, communication with the sensing system 518 can occur. As previously described, the battery of the sensing system 518 can be recharged with an optical signal or reprogrammed with the optical signal. Also, the sensing system 518 can send data back to the device 502 via the fiber 520. After the data collection from the sensing system 518 is complete, the fiber 520 can be disconnected until a future use.

Figure 6:
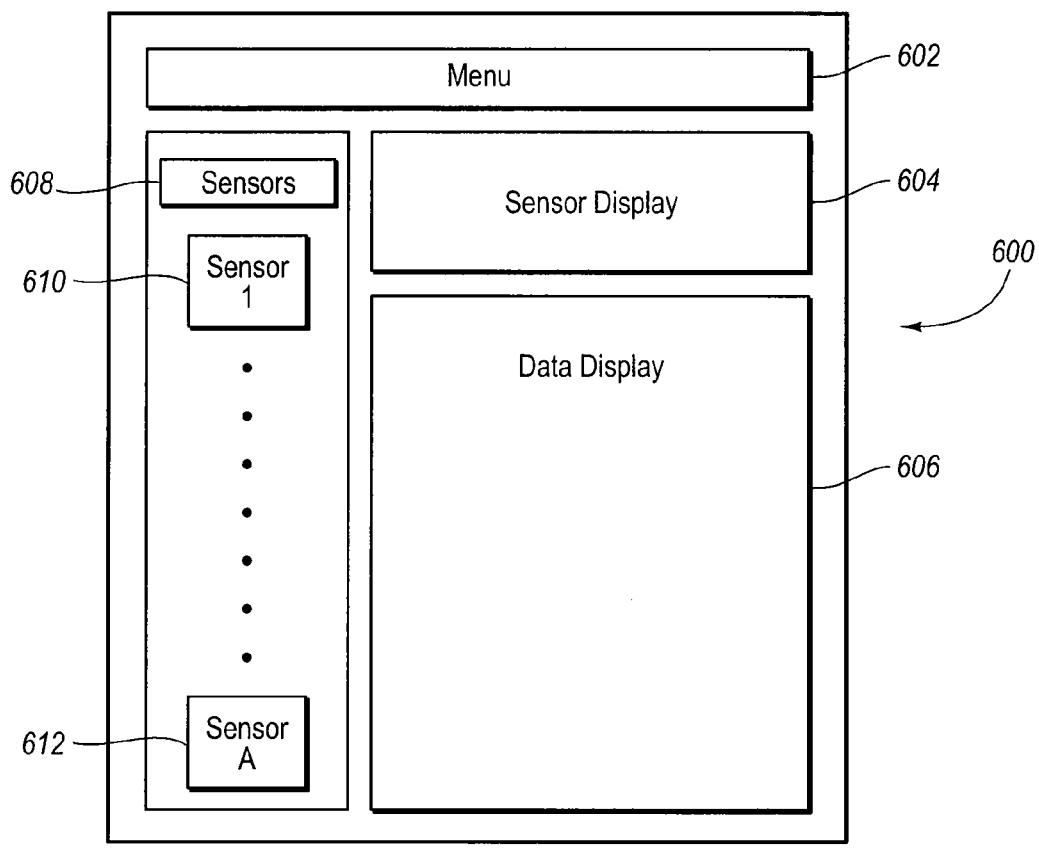
FIG. 6 illustrates one embodiment of a user interface for collecting data from sensing systems.

FIG. 6 illustrates one example of a user interface 600 at the device 502 for software that is used to display the data collected from the various sensing systems. The software can receive data from the sensing systems. The data is processed by the device 502 or the components 506 and displayed for view in the user interface 600.

The data display 606 can use a spreadsheet type format in one example. When a sensing system 610 is selected from the sensing systems 608, the corresponding sensor or set of sensors are activated to acquire data from the appropriate sensor(s). A history of the selected sensor's data may also be displayed along with current data in the data display 606. For example, if the sensing system 610 includes a GPS sensor, then the data display 606 may display multiple instances of GPS data. Each instance of elevation, latitude, and longitude can be displayed with a corresponding time.

If the sensing system 612 includes a spectral analysis sensor, then the data display 606 may include graphs as well as other spectral data that may be beneficial to a user. The sensor display 604 can be adapted to provide information from sensors in the sensing systems that may not be currently active in the data display 606. For example, the sensor display 604 may include graphical representations of time, temperature, etc. Alternatively, the sensor display 604 can provide an indication of the current data from a particular sensor.

A menu 602 may enable the user to access functionality that is common to software programs such as File, Edit, Select, Filter, View, Help, etc. The software associated with the user interface 600 provides a common interface for each component and for the different sensors in the sensing systems that may collect data. In one example, the software can be adapted by a user as required.

Embodiments of the invention can be used in field biology to improve the way data is collected. Each sensing system module may include a set of sensors and has the ability to communicate wirelessly or through an optical fiber. The data can be collected in real time and with improved accuracy. In fact, the components enable the data to be processed as the data is collected.

Figure 7:
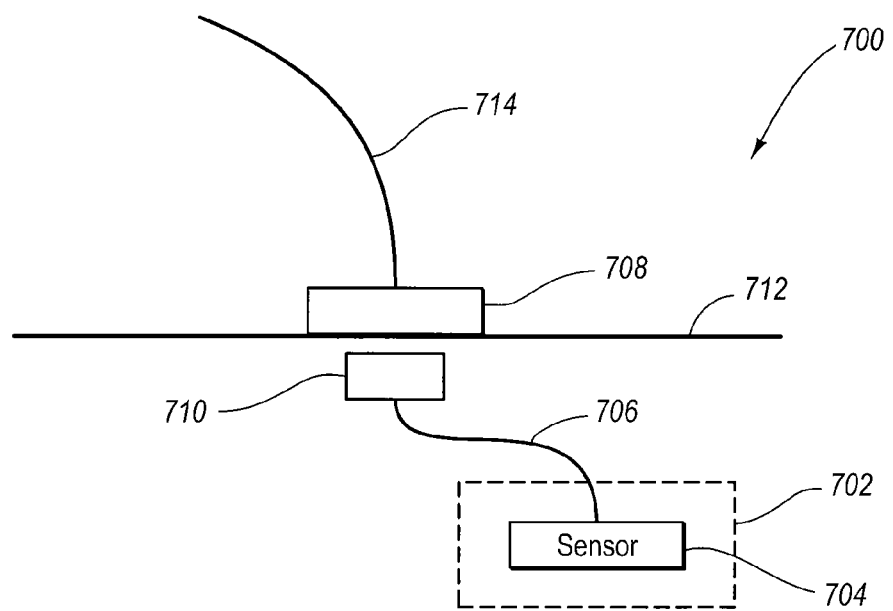
FIG. 7 illustrates an embodiment of a sub-dermal sensing system that is reprogrammed and recharged through a boundary such as a dermal layer.

FIG. 7 illustrates another embodiment of the invention using sensing system to collect data. FIG. 7 illustrates a sensing system 704 that is used in a medical or biological environment. The sensing system 704 is implanted underneath the skin 712 of a body. No part of the sensing system 704 is left extending from the body and the skin can therefore heal to prevent infection, for example. The sensing system 704 may be also enclosed in a protective cover 702 that does not interfere with the function of the sensing system 704 but that protects the host.

The sensing system 704 is connected with the sensor interface 710 via the fiber 706. The power source of the sensing system 704 can be recharged by placing a corresponding interface 708 over the area of the skin 712 where the interface 710 is located. An optical signal can be transmitted via the fiber 714 and through the skin 712 to the interface 710. The optical signal transmitted through the dermal layers can still have sufficient optical power to charge the sensor 704 as described herein without causing injury to the skin 712. The optical signal, in addition to recharging the sensing system 704, can also be used to reprogram the sensing system 704 or to recalibrate the sensor(s) in the sensing system 704.

FIG. 7 therefore illustrates an example of a subdermal interface that can be used to communicate with a sensing system that is inside of another body. The optical interfaces can transmit through a boundary such as skin. The optical interfaces on both sides of the skin should be positioned to enable sufficient optical signal to be transmitted through the skin without harming the skin. In this manner, data collected from the sensing system 704 can be collected and the sensing system 704 can be controlled, charged, reprogrammed, etc.

Embodiments of the invention also have the ability to provide advance warning for various scenarios. For example, sensing system with the ability to transmit data wirelessly or via a tethered fiber can be deployed and configured to sense antibodies or antigens. The sensing systems can provide advance notice of a biological, nuclear, or other event. In another example, a sensing system can transmit data as a nuclear device is tested. Even though the sensing system is likely destroyed by the nuclear test, sufficient data may be captured and transmitted to help understand the tested event.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for communicating with a sensing system disposed within a body, the method comprising:
    placing the sensing system within the body, wherein the sensing system includes an optical module including a plurality of photodiodes that generate a current in response to an incident optical signal used to communicate with the sensing system;
    locating a first interface at a first side of a boundary of the body;
    providing a first optical fiber coupled between the optical module and the first interface such that the first interface is configured to be located at a different location within the body than the sensing system, wherein the first optical fiber, the sensing system and the first interface are located entirely within the body;
    locating a second interface at a second side of the boundary opposite the first interface, the second interface coupled to a second optical fiber; and
    transferring an input optical signal through the second optical fiber and through the boundary of the body into the first optical fiber such that the input optical signal is incident on the plurality of photodiodes,
    wherein a battery of the sensing system is recharged with the current generated by the plurality of photodiodes in response to the incident optical communication signal and wherein the battery stores electrical energy as chemical energy.

2. A method as defined in claim 1, further comprising securing the first interface at the boundary, wherein the boundary is skin.

3. A method as defined in claim 1, further comprising modulating the input optical signal to deliver data to a processing module of the sensing system, the input optical signal that delivers the data further charging a battery within the sensing system.

4. A method as defined in claim 3, further comprising at least one of: recalibrating a sensor included in the sensing system with the modulated input optical signal; and reprogramming the sensing system with the modulated input optical signal.

5. A method as defined in claim 3, further comprising receiving data through the boundary on an output optical signal, the output optical signal generated by a laser included in the sensing system.

6. An apparatus for renewing a power supply of a sensing system configured to be enclosed within a body, the apparatus comprising:
    the sensing system configured to be disposed entirely within the body, the sensing system including one or more photodiodes that generate current in response to an optical signal used to communicate with the sensing system, the sensing system further including at least three planes having a substantially uniform shape and directly disposed one on top of another, including:
        a power plane including the power supply disposed within a cavity of the power plane;
        a processing plane having a processing module, memory, and one or more field programmable gate arrays disposed within cavities of the processing plane; and
        a sensor plane including one or more sensors disposed within one or more cavities of the sensor plane, each sensor having a size of less than 1 $cm^3$, wherein the power plane, the processing plane, and the sensor plane are disposed directly one upon another, and have contacts and leads that enable interplane connectivity;
    a first interface configured to be secured near a boundary of the body such that it can receive the optical signal through the boundary of the body; and
    an optical fiber coupled between the sensing system and the first interface such that the first interface is configured to be positioned at a different location within the body than the sensing system;
    wherein:
        the optical fiber, sensing system and first interface are configured to be located entirely within the body;
        the current generated by the one or more photodiodes in response to the optical signal charges a battery of the sensing system; and
        the battery stores electrical energy as chemical energy.

7. An apparatus as defined in claim 6, wherein one or more photodiodes are grown monolithically in series with a semiconductor laser capable of transmitting data collected by a sensor included in sensing system.

8. An apparatus as defined in claim 6, wherein the boundary is skin.

9. An apparatus as defined in claim 8, further comprising a second interface and a second optical fiber that can be removably positioned over the first interface at the skin such that the optical signal can be delivered from the second interface to the first interface through the skin.

* * * * *